(12) United States Patent
Soeno et al.

(10) Patent No.: US 9,495,983 B2
(45) Date of Patent: Nov. 15, 2016

(54) MAGNETIC HEAD WITH MICROWAVE-GENERATING ELEMENT AND GROUND LINE THEREFOR

(71) Applicant: TDK CORPORATION, Tokyo (JP)

(72) Inventors: Yoshikazu Soeno, Tokyo (JP); Takuya Adachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 13/849,791

(22) Filed: Mar. 25, 2013

(65) Prior Publication Data

US 2013/0258527 A1 Oct. 3, 2013

(30) Foreign Application Priority Data

Mar. 27, 2012 (JP) ................................ 2012-070666

(51) Int. Cl.
*G11B 5/00* (2006.01)
*G11B 5/60* (2006.01)
*G11B 5/48* (2006.01)

(52) U.S. Cl.
CPC ............. *G11B 5/486* (2013.01); *G11B 5/6088* (2013.01); *G11B 2005/0024* (2013.01)

(58) Field of Classification Search
CPC .............. G11B 2005/0024; G11B 5/314; G11B 5/1278
USPC .............. 360/125.3, 125.31, 125.71, 125.74, 360/264.2, 266.3, 245.8
See application file for complete search history.

(56) References Cited

U.S. PATENT DOCUMENTS

| | | | |
|---|---|---|---|
| 7,382,582 B1* | 6/2008 | Cuevas ..................... | 360/245.9 |
| 7,957,085 B2* | 6/2011 | Tanaka ................. | G11B 5/4826 360/125.31 |
| 7,974,043 B2* | 7/2011 | Shimazawa ............. | G11B 5/02 360/125.31 |
| 8,023,226 B2* | 9/2011 | Shimazawa ............. | G11B 5/02 360/125.74 |
| 8,665,567 B2* | 3/2014 | Shum et al. ............... | 360/294.3 |
| 2002/0118492 A1* | 8/2002 | Watanabe et al. ......... | 360/294.4 |
| 2004/0070880 A1* | 4/2004 | Fu ........................... | B24B 37/00 360/234.5 |
| 2005/0195528 A1* | 9/2005 | Bennin et al. ............. | 360/234.5 |
| 2006/0023362 A1* | 2/2006 | Boljanovic ................ | 360/244.1 |
| 2007/0253106 A1* | 11/2007 | Sato ........................ | G11B 5/02 360/125.02 |
| 2008/0170326 A1* | 7/2008 | Feng .................... | G11B 5/4853 360/99.04 |

(Continued)

FOREIGN PATENT DOCUMENTS

| | | |
|---|---|---|
| JP | A-09-251813 | 9/1997 |
| JP | A-2010-073297 | 4/2010 |

OTHER PUBLICATIONS

Zhu et al., "Microwave Assisted Magnetic Recording," IEEE Transactions on Magnetics, 2008, vol. 44, No. 1, pp. 125-131.

*Primary Examiner* — Adam B Dravininkas
(74) *Attorney, Agent, or Firm* — Oliff PLC (57) ABSTRACT

A magnetic head includes a microwave-generating element connected to a ground line. The ground line is made shorter by connecting the ground line to a conductive slider substrate so that the microwave-generating element is in a nearly short-circuited end condition. This allows a microwave excitation current to be efficiently supplied to the microwave-generating element, thus enabling effective microwave-assisted recording.

6 Claims, 6 Drawing Sheets

(56) References Cited

U.S. PATENT DOCUMENTS

2008/0304176 A1* 12/2008 Takagishi et al. .............. 360/86
2010/0033881 A1*  2/2010 Carey .................... B82Y 10/00
                                              360/324.11
2011/0038081 A1*  2/2011 Contreras et al. ....... 360/125.03
2012/0262820 A1* 10/2012 Matsumoto et al. ...... 360/99.08

* cited by examiner

MAGNETIC HEAD WITH MICROWAVE-GENERATING ELEMENT AND GROUND LINE THEREFOR

BACKGROUND OF THE INVENTION

1. Field of the Invention

The present invention relates to magnetic heads for magnetic recording and magnetic recording apparatuses and, more specifically, to magnetic heads and magnetic recording apparatuses for microwave-assisted recording.

2. Description of the Related Art

There is a need for magnetic disk apparatuses, which are a type of magnetic recording apparatus, with higher recording densities. To ensure the write signal quality (S/N ratio) required for high-density recording, the size of magnetic grains forming magnetic recording media needs to be reduced with increasing areal recording density. Such magnetic grains, however, tend to suffer magnetization loss due to thermal fluctuations. To prevent this and maintain stable magnetization, the magnetic anisotropy energy of the magnetic grains needs to be increased. A material with high magnetic anisotropy energy forms a magnetic recording medium with high coercivity, which requires a strong write magnetic field for signal recording. This makes it difficult to perform recording because the strength of a magnetic field generated by a write head element is limited by the material and shape of the write head element.

To solve this technical problem, energy-assisted recording has been proposed, which applies supplementary energy to a magnetic recording medium during recording to decrease the effective coercivity, thereby assisting in signal recording on the medium (magnetization reversal of magnetic grains). A type of recording that uses a microwave magnetic field as a supplementary energy source is called microwave-assisted magnetic recording (MAMR) (see, for example, Jian-Gang Zhu, Xiaochun Zhu, and Yuhui Tang, "Microwave Assisted Magnetic Recording," IEEE Transactions on Magnetics, Vol. 44, No. 1, January 2008).

There are known microwave-assisted magnetic recording systems, including systems (internal-oscillation systems) in which a microwave oscillator disposed near a write head element on a magnetic head generates a microwave magnetic field, and systems (external-oscillation systems) in which a microwave-generating element formed near a write head element generates a microwave magnetic field as it is supplied with a microwave excitation current by a microwave-signal generating circuit independent of the magnetic head. External-oscillation systems require microwave transmission lines for supplying a microwave excitation current to the microwave-generating element to be formed on a suspension and on a surface of a head slider on which the microwave-generating element is formed.

Japanese Unexamined Patent Application Publication No. 2010-73297 discloses a microwave transmission line provided on a suspension to reduce transmission loss of microwave signals. This technique controls the characteristic impedance of a microwave transmission line by modifying the positional relationship between shields disposed above and below the microwave transmission line and conductive posts connecting the shields to allow efficient transmission of microwave signals.

Japanese Unexamined Patent Application Publication No. 9-251813 discloses a technique for reducing transmission loss of write and read signals using a flexible printed cable (FPC) including signal lines, each composed of a plurality of conductors connected in parallel to reduce the inductance of the signal lines. This publication, however, does not mention the transmission or loss reduction of microwave signals.

These publications propose techniques for improving the characteristics of a transmission line formed on a suspension; they propose no technique for improving the microwave signal (excitation current) transmission characteristics of a microwave-generating element line formed on a side surface of a head slider (element-forming surface).

Effective microwave-assisted recording requires a certain microwave magnetic field strength. To efficiently generate a certain microwave magnetic field using a limited power supply to a magnetic recording apparatus, a microwave excitation current needs to be efficiently supplied to the microwave-generating element. This is also important for power conservation of the magnetic recording apparatus.

The above publications disclose only the control of the characteristic impedance of a transmission line on a suspension to reduce transmission loss for efficient transmission of microwave signals or write and read signals. However, only the control of the characteristic impedance of a microwave transmission line on a suspension is insufficient to efficiently supply a microwave excitation current to a microwave-generating element on a head slider, and the design of a line connected to a microwave-generating element formed on a head slider needs to be optimized.

The above publications, however, do not mention the optimization of a microwave element and a line formed on a head slider.

SUMMARY OF THE INVENTION

In light of the foregoing problem, it is an object of the present invention to provide a magnetic head including a line that is connected to a microwave-generating element formed on a head slider and that is optimized to efficiently supply a microwave excitation current to the microwave element so that it can generate a microwave magnetic field with a certain strength using a limited power.

The foregoing object is achieved by the following solutions.

Specifically, a magnetic head according to an aspect of the present invention includes a magnetic head slider and a suspension. The magnetic head slider includes a write head element that applies a write signal magnetic field to a magnetic recording medium and a microwave-generating element that applies a microwave magnetic field to the magnetic recording medium when the write head element applies the write signal magnetic field. The suspension supports the magnetic head slider and has a line through which a microwave signal is transmitted. The microwave-generating element is in a nearly short-circuited end condition.

In the above magnetic head, the magnetic head slider preferably further includes a grounded conductive head slider substrate and a ground line through which the microwave-generating element is connected to the head slider substrate.

In the above magnetic head, the head slider substrate is preferably formed of AlTiC ($Al_2O_3$—TiC).

In the above magnetic head, the microwave magnetic field preferably has a frequency of 1 to 50 GHz.

In the above magnetic head, the length of the ground line is preferably one sixth or less the wavelength of the microwave signal.

In the above magnetic head, the ground line is preferably not exposed in a surface of the magnetic head slider opposite the magnetic recording medium.

A magnetic recording apparatus according to another aspect of the present invention includes the above magnetic head. The microwave-generating element applies a microwave magnetic field to a magnetic recording medium to assist in signal recording on the magnetic recording medium when the write head element applies a write signal magnetic field to the magnetic recording medium.

According to the above aspects of the present invention, the microwave-generating element is in a nearly short-circuited end condition, which allows a microwave signal to be substantially totally reflected in a radio-frequency circuit, so that a microwave excitation current can be efficiently supplied to the microwave-generating element. This enables generation of a microwave magnetic field with a certain strength effective for microwave assistance using the limited power of the magnetic recording apparatus.

DESCRIPTION OF THE PREFERRED EMBODIMENTS

Embodiments of the present invention will now be described with reference to the drawings. For clarity of the drawings, the components in the drawings are not necessarily to scale.

Figure 1:
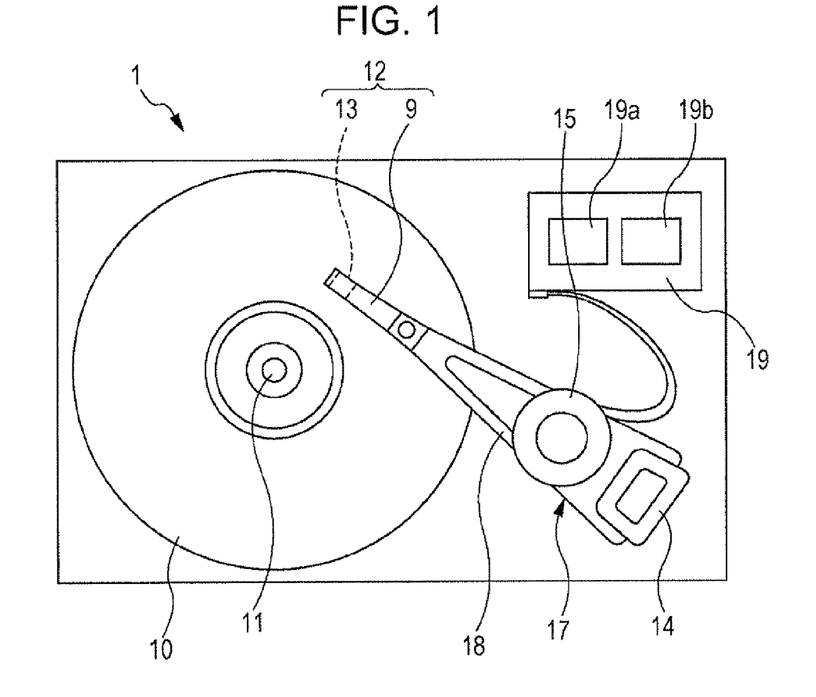
FIG. 1 is a schematic view of a magnetic recording apparatus (magnetic disk apparatus)

FIG. 1 shows a schematic view of a magnetic recording apparatus. A magnetic recording apparatus 1 includes a magnetic recording medium (magnetic disk) 10 and a magnetic head 12. The magnetic recording apparatus 1 is not limited to any particular number of magnetic recording media 10 and magnetic heads 12 and may include a plurality of magnetic recording media 10 and magnetic heads 12. The magnetic head 12 includes a magnetic head slider 13 and a suspension 9 supporting the head slider 13. The magnetic recording medium 10 is rotated by a spindle motor 11 about the axis of rotation thereof. The head slider 13 writes and reads data signals to and from the magnetic recording medium 10. In an embodiment of the present invention, the head slider 13 may at least write data signals to the magnetic recording medium 10. The magnetic head 12 is mounted on a drive arm 18 rotatable about a pivot bearing shaft 15. The magnetic head 12 and the arm 18 are collectively referred to as a head arm assembly 17. The suspension 9 is rotated by a voice coil motor (VCM) 14 to position the head slider 13 over the magnetic recording medium 10. A write, read, and resonance control circuit 19 controls write and read operations of the head slider 13 and also controls a microwave excitation current for ferromagnetic resonance, described later. More specifically, the write, read, and resonance control circuit 19 includes a microwave-signal generating circuit 19a connected to a microwave signal transmission line 22c, described later, and a controller 19b that controls the microwave-signal generating circuit 19a.

The following description is based on the structure illustrated in FIG. 1.

Figure 2A:
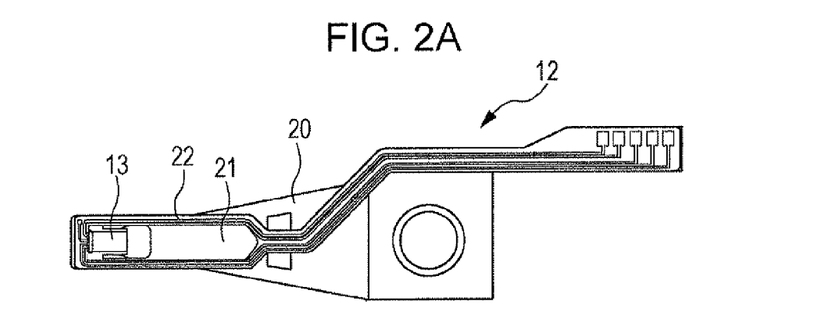
FIGS. 2A and 2B are a plan view and a side view, respectively, of a magnetic head.
Figure 2B:
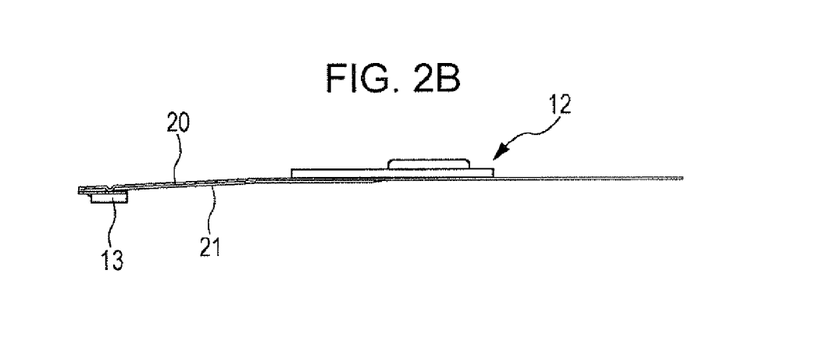

FIGS. 2A and 2B show a plan view (bottom view as viewed from the magnetic recording medium 10) and a side view, respectively, of the magnetic head 12. The suspension 9 includes a flexure 21 having the magnetic head slider 13 attached to one end thereof, transmission lines 22 formed on a surface of the flexure 21, and a load beam 20 that presses the head slider 13 down toward the surface of the magnetic recording medium 10 under a predetermined pressure. The flexure 21 is resilient and functions as a gimbal to allow the head slider 13 to follow variations in the surface height of the magnetic recording medium 10. The flexure 21 is joined to the load beam 20. The load beam 20 is joined to the drive arm 18, which positions the head slider 13 over the magnetic recording medium 10.

Figure 3:
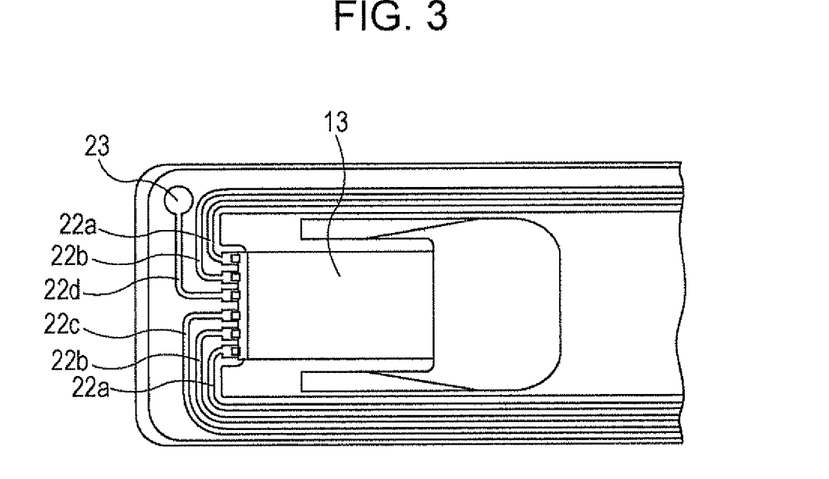
FIG. 3 is an enlarged view of an end of the magnetic head.

FIG. 3 is an enlarged view of an end of the magnetic head 12. This figure schematically shows the paths of the transmission lines 22.

The transmission lines 22 include write signal transmission lines 22a through which a write signal is transmitted to a write head element of the head slider 13, read signal transmission lines 22b through which a read output voltage is output from a read head element, a microwave signal transmission line (excitation current transmission line) 22c through which a microwave excitation current is supplied to one end of a microwave-generating element, and a microwave transmission line 22d through which the other end of the microwave element is grounded. The microwave transmission line 22d is grounded to the flexure 21 at a ground terminal 23. Depending on the functions of the magnetic head 12, the transmission lines 22 may include transmission lines for a heater for adjusting the float height and a sensor for detecting the float height (neither is shown). The transmission lines 22a, 22b, 22c, and 22d are typically formed of copper.

Figure 4:
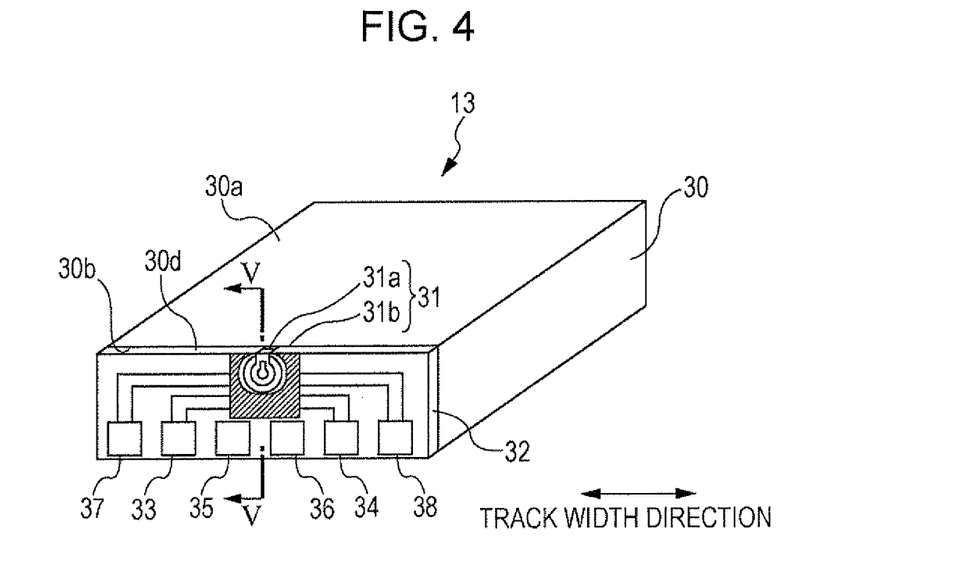
FIG. 4 is a schematic perspective view of a magnetic head slider.

FIG. 4 is a perspective view schematically showing the entire head slider 13 in this embodiment. The head slider 13 includes a head slider substrate 30 having an air bearing surface (ABS) 30a formed so as to provide a suitable float height, a magnetic head element 31 disposed on an element-forming surface 30b perpendicular to the ABS 30a, a protection layer 32 disposed on the element-forming surface 30b so as to cover the magnetic head element 31, and six terminal electrodes 33, 34, 35, 36, 37, and 38 exposed in the surface of the protection layer 32. The terminal electrodes 33, 34, 35, 36, 37, and 38 are not necessarily disposed at the positions illustrated in FIG. 5, but may be disposed at any positions and in any arrangement on the element-forming surface 30b. If the head slider 13 includes a heater and a sensor, it also includes terminal electrodes electrically connected thereto.

The head slider 13 is mainly composed of a magnetoresistive (MR) read head element 31a for reading data signals from the magnetic recording medium 10 and a write head element 31b for writing data signals to the magnetic recording medium 10. The terminal electrodes 33 and 34 are electrically connected to the MR read head element 31a. The terminal electrodes 37 and 38 are electrically connected to the write head element 31b. The terminal electrodes 35 and 36 are electrically connected to a microwave-generating element 39, described later.

In this embodiment, the ends of the transmission lines 22a, 22b, 22c, and 22d facing the magnetic head slider 13 are connected to the terminal electrodes of the write head element 31b, the read head element 31a, and the microwave-generating element 39 by ball bonding. Alternatively, the transmission lines 22a, 22b, 22c, and 22d may be connected to the terminal electrodes by wire bonding.

The ends of the MR read head element 31a and the write head element 31b are located in the ABS 30a (more specifically, in a magnetic head slider end surface 30d of the ABS 30a). The ends of the MR read head element 31a and the write head element 31b are positioned opposite the magnetic recording medium 10 to read a data signal by detecting a signal magnetic field and to write a data signal by applying a signal magnetic field. The ends of the elements 31a and 31b in the ABS 30a and the vicinity thereof are protected by, for example, an extremely thin diamond-like carbon (DLC) coating.

Figure 5:
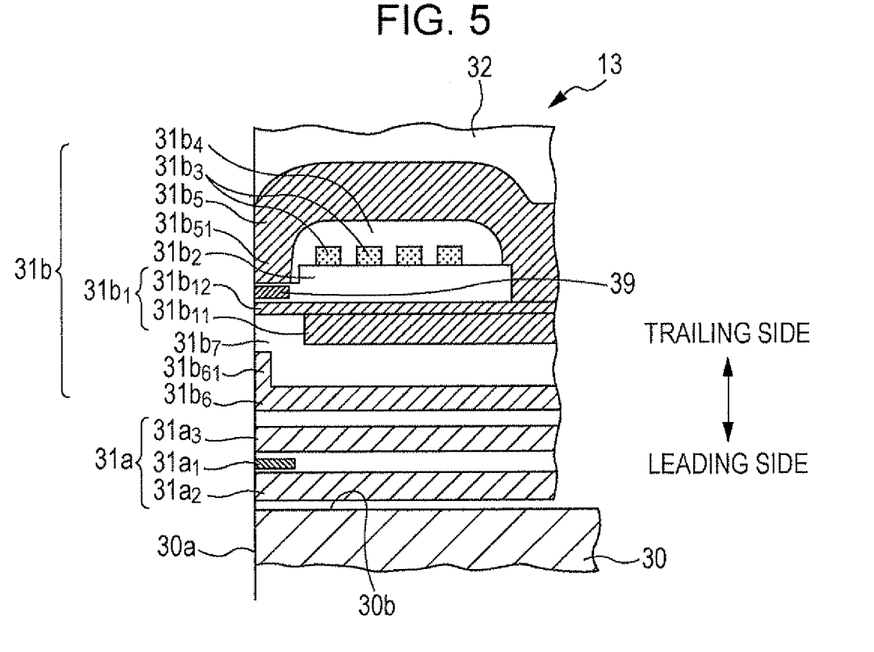
FIG. 5 is a sectional view of the magnetic head slider.

FIG. 5 is a sectional view taken along line V-V in FIG. 4. The MR read head element 31a, the write head element 31b, the microwave-generating element 39, and the protection layer 32, which protects the elements 31a, 31b, and 39, are mainly formed on the element-forming surface 30b of the head slider substrate 30, which is formed of, for example, AlTiC ($Al_2O_3$—TiC).

The MR read head element 31a includes a lower shield layer $31a_2$, an upper shield layer $31a_3$, and an MR stack $31a_1$ disposed therebetween. The MR stack $31a_1$ detects a signal magnetic field from the magnetic recording medium 10 and is composed of a current-in-plane (CIP) giant magnetoresistive (GMR) multilayer film, a current-perpendicular-to-plane (CPP) GMR multilayer film, or a tunneling magnetoresistive (TMR) multilayer film. The lower shield layer $31a_2$ and the upper shield layer $31a_3$ avoid the influence of an external magnetic field, which causes noise in the MR stack $31a_1$.

The write head element 31b is configured for perpendicular magnetic recording. Specifically, the write head element 31b includes a main magnetic pole layer $31b_1$, a trailing gap layer $31b_2$, a write coil $31b_3$, a write-coil insulating layer $31b_4$, an auxiliary magnetic pole layer $31b_5$, an auxiliary shield layer $31b_6$, and a leading gap layer $31b_7$. The write coil $31b_3$ is formed so as to extend between the main magnetic pole layer $31b_1$ and the auxiliary magnetic pole layer $31b_5$. The main magnetic pole layer $31b_1$ functions as a main magnetic pole in the write head element 31b and generates a write magnetic field from the end thereof facing the ABS 30a during writing of a data signal.

The main magnetic pole layer $31b_1$ functions as a magnetic guide path through which a magnetic flux generated as a write current is applied to the write coil $31b_3$ is guided to the magnetic recording layer on the magnetic recording medium 10 while converging. The main magnetic pole layer $31b_1$ includes a main magnetic pole yoke layer $31b_{11}$ and a main magnetic pole main layer $31b_{12}$.

The auxiliary magnetic pole layer $31b_5$ is disposed on the trailing side of the main magnetic pole layer $31b_1$. The auxiliary shield layer $31b_6$ is disposed on the leading side of the main magnetic pole layer $31b_1$.

The end of the auxiliary magnetic pole layer $31b_5$ facing the ABS 30a forms a trailing shield portion $31b_{51}$ having a wider layer cross-section than the remaining portion, whereas the end of the auxiliary shield layer $31b_6$ facing the ABS 30a forms a leading shield portion $31b_{61}$ having a wider layer cross-section than the remaining portion. The trailing shield portion $31b_{51}$ is disposed opposite the end of the main magnetic pole layer $31b_1$ facing the ABS 30a with the trailing gap layer $31b_2$ therebetween. The leading shield portion $31b_{61}$ is disposed opposite the end of the main magnetic pole layer $31b_1$ facing the magnetic head slider end surface 30d with the leading gap layer $31b_7$ therebetween. The trailing shield portion $31b_{51}$ and the leading shield portion $31b_{61}$ produce a magnetic-flux shunting effect so that the write magnetic field has a steeper magnetic field gradient between the trailing shield portion $31b_{51}$ and the end of the main magnetic pole layer $31b_1$ and between the end of the leading shield portion $31b_{61}$ and the end of the main magnetic pole layer $31b_1$. This reduces jitter in signal output and thus reduces the error rate in reading.

The auxiliary magnetic pole layer $31b_5$ or the auxiliary shield layer $31b_6$ may be formed so as to extend near both sides of the main magnetic pole layer $31b_1$ in the track width direction, thereby forming side shields.

The microwave-generating element 39 is formed between the main magnetic pole main layer $31b_{12}$ of the main magnetic pole layer $31b_1$ and the trailing shield portion $31b_{51}$ of the auxiliary magnetic pole layer $31b_5$.

Figure 6:
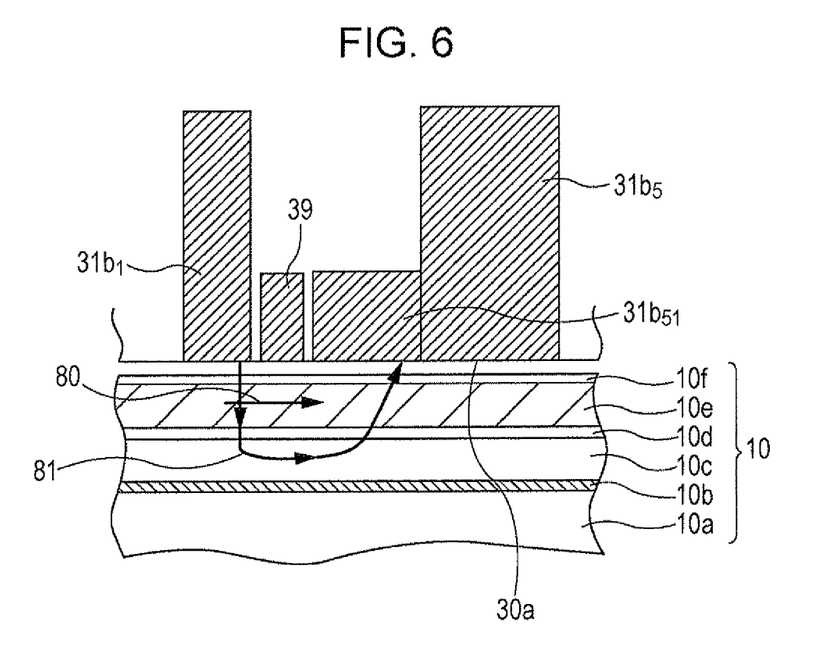
FIG. 6 is a schematic view illustrating the mechanism of microwave-assisted magnetic recording.

FIG. 6 is a sectional view illustrating the mechanism of microwave-assisted magnetic recording. As a microwave excitation current is supplied from the terminal electrode to the microwave-generating element 39, it generates and applies a microwave magnetic field to the magnetic recording medium 10 positioned in proximity thereto. The magnetic recording medium 10, which is designed for perpendicular magnetic recording, has a multilayer structure on a disk substrate 10a, including a magnetization orientation layer 10b, a soft magnetic underlayer 10c, an intermediate layer 10d, a magnetic recording layer 10e, and a protective layer 10f. The soft magnetic underlayer 10c forms part of a magnetic flux loop circuit.

The magnetization orientation layer 10b induces a magnetic anisotropy in the soft magnetic underlayer 10c in the track width direction to stabilize the magnetic domain structure of the soft magnetic underlayer 10c, thereby reducing spike noise in read output waveforms. The intermediate layer 10d functions as a seed layer to control the magnetization orientation and grain size of the magnetic recording layer 10e.

The ferromagnetic resonance frequency FMR of the magnetic recording layer 10e is an intrinsic value determined by factors such as the shape, size, constituent elements, magnetic properties, and magnetization of the magnetic grains forming the magnetic recording layer 10e and the strength of the write magnetic field. The ferromagnetic resonance frequency FMR is generally about 1 to 50 GHz.

As a microwave excitation current is supplied to a conductor forming the microwave-generating element 39, a microwave magnetic field is generated around the microwave-generating element 39. The microwave-generating element 39, which is positioned in proximity to the magnetic recording medium 10, applies a resonance magnetic field 80 in the magnetic recording medium 10 substantially parallel to the plane of the magnetic recording medium 10. The resonance magnetic field 80 is a radio-frequency magnetic field having a frequency in the microwave band that is equal or close to the ferromagnetic resonance frequency FMR of the magnetic recording layer 10e of the magnetic recording medium 10 with a write magnetic field being applied thereto.

The resonance magnetic field 80 is superimposed on a perpendicular write magnetic field 81 applied to the magnetic recording layer 10e by the main magnetic pole layer $31b_1$ of the write head element 31b, thus efficiently reducing the coercivity of the magnetic recording layer 10e. This results in a significant reduction in the write magnetic field strength required for writing in the perpendicular direction (perpendicular or substantially perpendicular to the surface of the magnetic recording layer 10e). The reduced coercivity facilitates magnetization reversal and thereby allows efficient recording with a weaker write magnetic field.

Figure 7:
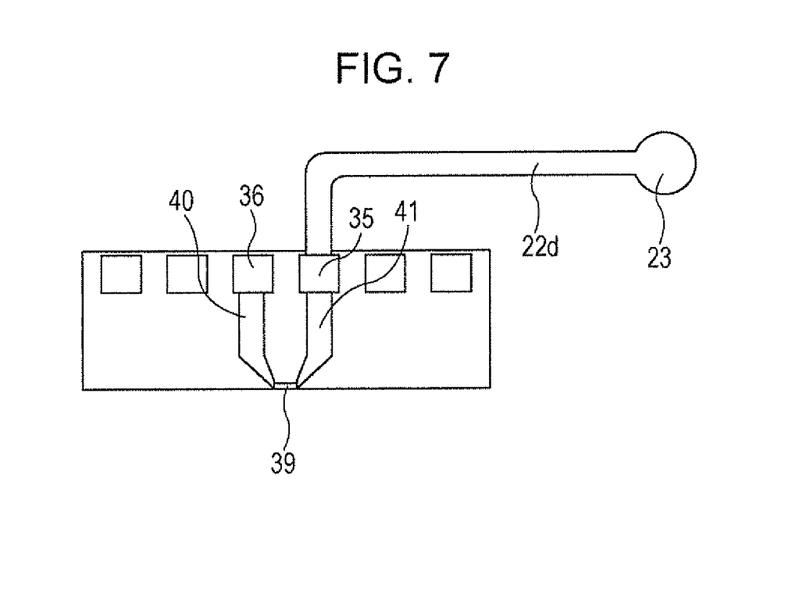
FIG. 7 is a schematic view showing a microwave transmission line in the related art.

FIG. 7 is a schematic view of a microwave-generating element and a wiring structure in the related art as viewed from the element-forming surface 30b of the magnetic head slider 13. The microwave-generating element 39, which is exposed in the ABS 30a of the head slider 13, is electrically connected to the terminal electrode 36 through a supply line 40 and to the terminal electrode 35 through a ground line 41. As a microwave excitation current is supplied from the microwave transmission line 22c through the terminal electrode 36 and the supply line 40 to the microwave-generating element 39, it generates and applies a microwave magnetic field to the magnetic recording medium 10 positioned in proximity thereto.

The microwave-generating element 39 is grounded to the flexure 21 at the ground terminal 23 through the ground line 41, the terminal electrode 35, and the microwave transmission line 22d formed on the suspension 9.

To strengthen the microwave magnetic field generated by the microwave-generating element 39, a microwave excitation current needs to be efficiently supplied thereto. Accordingly, the microwave-generating element 39 is preferably in a nearly short-circuited end condition. That is, it is preferable to minimize the length of the ground-side lines (ground line 41 and transmission line 22d) through which the microwave-generating element 39 is grounded.

Figure 8:
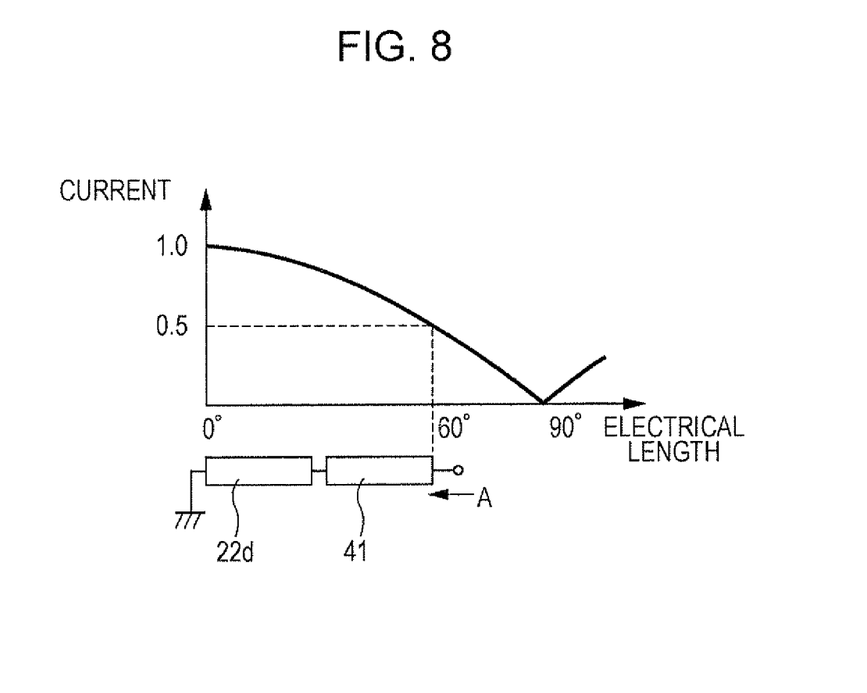
FIG. 8 is a graph showing the current characteristics of the microwave transmission line in the related art.

FIG. 8 shows the normalized microwave current of the microwave-generating element 39 against the electrical length of the ground-side lines from the microwave-generating element 39 (in the direction A) in the above structure in the related art.

If a microwave signal with a frequency of 30 GHz is applied, the total length of the ground line 41 and the microwave transmission line 22d is equivalent to an electrical length of about 60°, i.e., one sixth the wavelength of the microwave signal, and the normalized microwave current is 0.5 with respect to that in an ideal short-circuited end condition, i.e., 1. Accordingly, the microwave magnetic field is weaker.

The microwave excitation current that flows in an ideal short-circuited end condition is twice the current that flows through the characteristic impedance of a microwave transmission line formed on a suspension in the related art. The above results demonstrate that a higher microwave excitation current flows than in the related art if the electrical length of the ground-side lines is one sixth or less the wavelength of the microwave signal.

A magnetic recording apparatus according to an embodiment of the present invention includes a magnetic recording medium, a spindle motor that rotates the magnetic recording medium, a magnetic head, a VCM that rotates the magnetic head in the radial direction of the magnetic recording medium to position the magnetic head at a predetermined radial position, a write and read control circuit that controls write and read operations, and a resonance control circuit that controls a microwave excitation current. The magnetic head includes a write head element, a read head element, and the microwave-generating element as described above, which enables microwave-assisted recording.

EXAMPLES

Figure 9A:
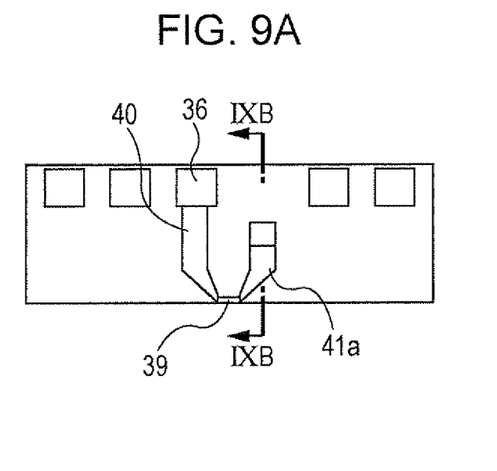
FIGS. 9A and 9B are schematic views showing a ground line according to an embodiment of the present invention.
Figure 9B:
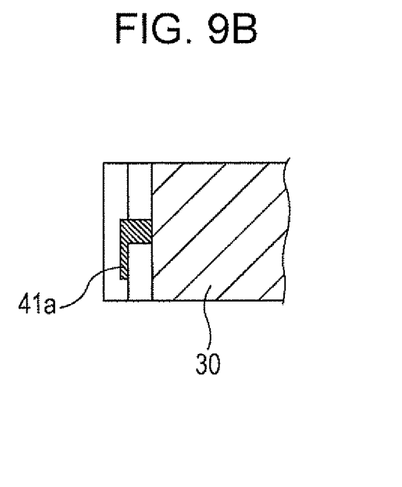

As an example of the present invention, FIGS. 9A and 9B show a structure in which the microwave-generating element 39 is connected to the grounded conductive head slider substrate 30 only through the ground line 41a. The head slider substrate 30 is formed of AlTiC. FIG. 9A is a plan view as viewed from the element-forming surface 30b, and FIG. 9B is a sectional view taken along line IXB-IXB in FIG. 9A. The ground line 41a is connected to the head slider substrate 30 so as not to interfere with the write head element 31b and the read head element 31a, which are not shown for illustration purposes. In this case, the transmission line 22d is not necessary, and the ground line 41a is accordingly shorter, so that the microwave-generating element 39 is closer to a short-circuited end condition.

Figure 10:
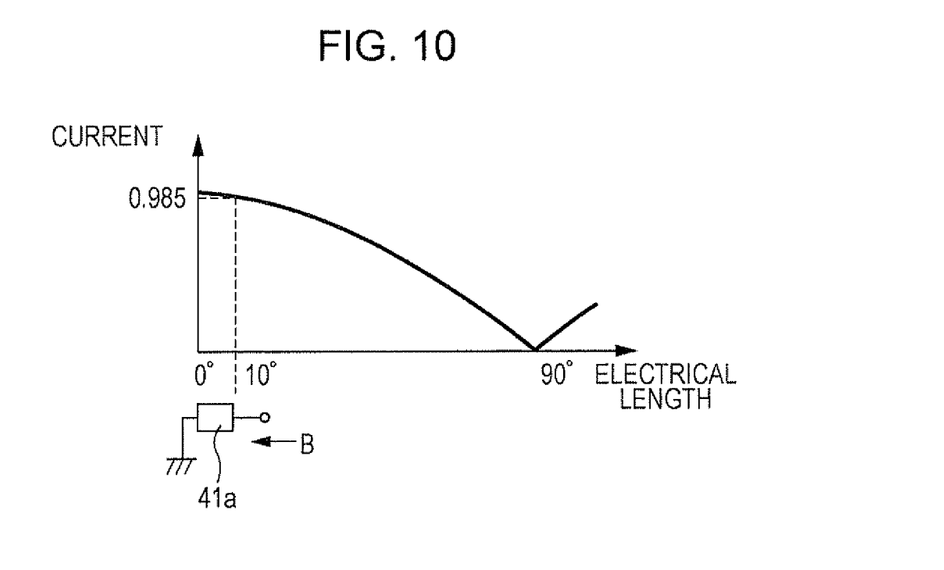
FIG. 10 is a graph showing the current characteristics of a microwave-generating element according to the embodiment of the present invention.

FIG. 10 shows the normalized microwave excitation current of the microwave-generating element 39 against the electrical length of the ground line 41a from the microwave-generating element 39 (in the direction B) in this example.

If a microwave signal with a frequency of 30 GHz is applied, the length of the ground line 41a is equivalent to an electrical length of about 10°, and the normalized microwave excitation current is 0.985 with respect to that in a short-circuited end condition, i.e., 1, indicating that the current increases significantly. Accordingly, the microwave magnetic field is stronger.

The ground line 41a applies no unnecessary microwave magnetic field from the ground line 41a to the magnetic recording medium 10 because the ground line 41a is not exposed in the ABS 30a.

Figure 11A:
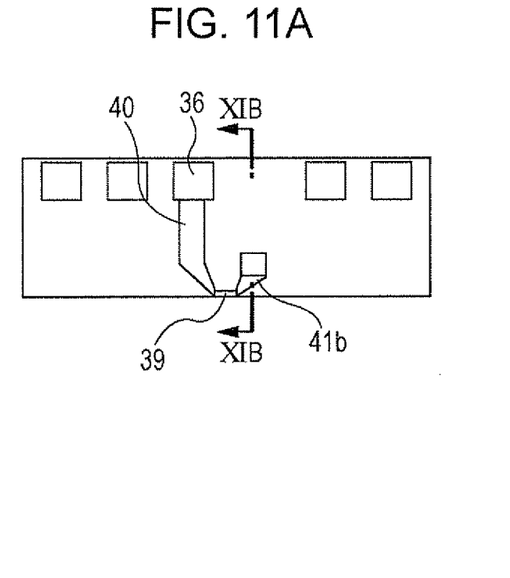
FIGS. 11A and 11B are schematic views showing a ground line according to another embodiment of the present invention.
Figure 11B:
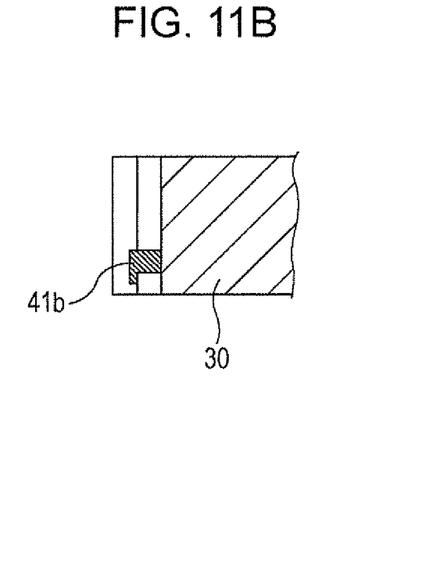

As another example of the present invention, FIGS. 11A and 11B show a structure in which the microwave-generating element 39 is connected to the grounded conductive head slider substrate 30 only through a shorter ground line 41b. The head slider substrate 30 is formed of AlTiC. FIG. 11A is a plan view as viewed from the element-forming surface 30b, and FIG. 11B is a sectional view taken along line XIB-XIB in FIG. 11A. The ground line 41b is connected and grounded to the head slider substrate 30 so as not to interfere with the write head element 31b and the read head element 31a, which are not shown for illustration purposes. In this case, the microwave-generating element 39 is in a nearly short-circuited end condition.

Figure 12:
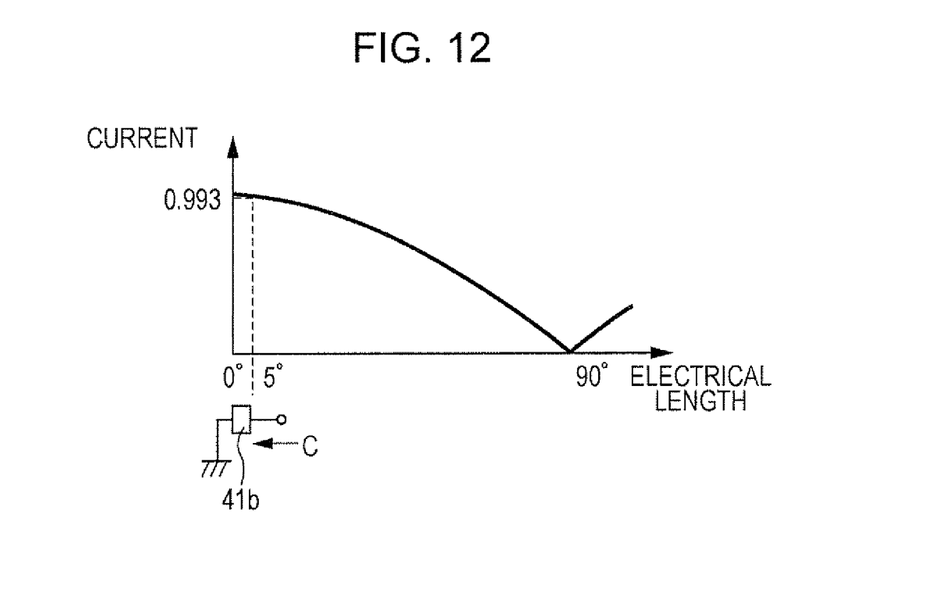
FIG. 12 is a graph showing the current characteristics of a microwave-generating element according to the other embodiment of the present invention.

FIG. 12 shows the normalized microwave excitation current of the microwave-generating element 39 against the electrical length of the ground line 41b from the microwave-generating element 39 (in the direction C) in this example.

If a microwave signal with a frequency of 30 GHz is applied, the length of the ground line 41b is equivalent to an electrical length of about 5°, and the normalized microwave excitation current is 0.993 with respect to that in a short-circuited end condition, i.e., 1, indicating that the microwave-generating element 39 is in a nearly short-circuited end condition. Accordingly, the microwave magnetic field is stronger.

The ground line 41b applies no unnecessary microwave magnetic field from the ground line 41b to the magnetic recording medium 10 because the ground line 41b is not exposed in the ABS 30a.

Although the above examples illustrate a head gimbal assembly composed of a flexure and a load beam, the flexure may be configured to function as a load beam to press the magnetic head slider 13 down toward the surface of the magnetic recording medium 10 under a predetermined pressure, by modifying the thickness, material, or shape of the flexure (e.g., by gradually increasing the width toward the head arm). It should be appreciated that such a head gimbal assembly composed only of a flexure provides the same advantages.

What is claimed is:

1. A magnetic head comprising:
a magnetic head slider including
   a write head element that applies a write signal magnetic field to a magnetic recording medium, and
   a microwave-generating element that applies a microwave magnetic field to the magnetic recording medium when the write head element applies the write signal magnetic field; and
a suspension that supports the magnetic head slider and that has a line through which a microwave excitation current is supplied to the microwave-generating element, the microwave excitation current being an alternating current,
wherein the microwave-generating element is in a nearly short-circuited end condition,
wherein the magnetic head slider further comprises:
   a grounded conductive head slider substrate; and
   a ground line through which the microwave-generating element is connected to the head slider substrate, and
wherein the head slider substrate consists of AlTiC ($Al_2O_3$—TiC).

2. The magnetic head according to claim 1, wherein the microwave magnetic field has a frequency of 1 to 50 GHz.

3. The magnetic head according to claim 1, wherein the length of the ground line is one sixth or less the wavelength of the microwave signal.

4. The magnetic head according to claim 1, wherein the ground line is not exposed in a surface of the magnetic head slider opposite the magnetic recording medium.

5. A magnetic recording apparatus comprising:
the magnetic head according to claim 1,
wherein the microwave-generating element applies the microwave magnetic field to the magnetic recording medium to assist in signal recording on the magnetic recording medium when the write head element applies the write signal magnetic field to the magnetic recording medium.

6. The magnetic head according to claim 1, wherein:
the microwave-generating element, a terminal electrode, a supply line, and the ground line are formed on an element-forming surface of the head slider substrate,
the supply line is connected to the microwave-generating element and the terminal electrode,
the microwave excitation current is supplied to the microwave-generating element via the supply line, and
a length of the ground line is shorter than a length of the supply line.

* * * * *